United States Patent
Yatsunami et al.

(10) Patent No.: US 11,104,283 B2
(45) Date of Patent: Aug. 31, 2021

(54) VEHICULAR ENERGY ABSORBING MEMBER AND MANUFACTURING METHOD THEREOF

(71) Applicants: AISIN SEIKI KABUSHIKI KAISHA, Kariya (JP); AISIN KEIKINZOKU KABUSHIKI KAISHA, Imizu (JP)

(72) Inventors: Hiroyuki Yatsunami, Kariya (JP); Shunji Shibata, Kariya (JP); Kiyoichi Kita, Okazaki (JP); Kyosuke Matsui, Anjo (JP); Jun Shobo, Anjo (JP)

(73) Assignees: Aisin Seiki Kabushiki Kaisha, Kariya (JP); Aisin Keikinzoku Kabushiki Kaisha, Imizu (JP)

( * ) Notice: Subject to any disclaimer, the term of this patent is extended or adjusted under 35 U.S.C. 154(b) by 56 days.

(21) Appl. No.: 16/685,494

(22) Filed: Nov. 15, 2019

(65) Prior Publication Data

US 2020/0156575 A1 May 21, 2020

(30) Foreign Application Priority Data

Nov. 16, 2018 (JP) .............................. JP2018-215313
May 16, 2019 (JP) .............................. JP2019-092881

(51) Int. Cl.
*B60J 9/00* (2006.01)
*B60R 19/34* (2006.01)

(52) U.S. Cl.
CPC ................................... *B60R 19/34* (2013.01)

(58) Field of Classification Search
CPC ... B29C 66/71; Y10T 74/20834; B62D 1/195; B62D 1/04; Y02E 10/44; A61F 2002/30433; A61F 2220/0041; A61F 2/66; A61F 2002/5055; A61F 2002/6657
See application file for complete search history.

(56) References Cited

U.S. PATENT DOCUMENTS

| | | | |
|---|---|---|---|
| 9,187,127 B2 * | 11/2015 | Tyan | B62D 21/152 |
| 9,533,710 B2 * | 1/2017 | Cheng | B62D 21/152 |
| 9,701,267 B1 * | 7/2017 | Ohmura | B60R 19/34 |
| 9,789,906 B1 * | 10/2017 | Tyan | B62D 25/00 |
| 9,840,281 B2 * | 12/2017 | Tyan | B60R 19/34 |
| 9,889,887 B2 * | 2/2018 | Tyan | F16F 7/12 |
| 9,944,323 B2 * | 4/2018 | Tyan | B62D 21/15 |
| 10,220,881 B2 * | 3/2019 | Tyan | B32B 7/08 |
| 10,279,842 B2 * | 5/2019 | Tyan | B62D 25/00 |
| 10,300,947 B2 * | 5/2019 | Tyan | B60R 16/0215 |
| 10,315,698 B2 * | 6/2019 | Tyan | F16F 7/12 |
| 10,429,006 B2 * | 10/2019 | Tyan | B32B 15/046 |

(Continued)

FOREIGN PATENT DOCUMENTS

JP 2007-261557 10/2007

*Primary Examiner* — Kiran B Patel
(74) *Attorney, Agent, or Firm* — Finnegan, Henderson, Farabow, Garrett & Dunner, LLP

(57) ABSTRACT

A vehicular energy absorbing member that is disposed between a bumper reinforcement and a framework of a vehicle includes an energy absorbing portion that has a tubular shape and is configured to absorb impact energy by being plastically deformed to be compressed in an axial direction. An outer circumferential surface of the energy absorbing portion has a circular tubular shape and an inner circumferential surface of the energy absorbing portion includes a ridge portion having a shape extending in the axial direction of the energy absorbing portion.

11 Claims, 7 Drawing Sheets

(56) References Cited

U.S. PATENT DOCUMENTS

| | | | |
|---|---|---|---|
| 2004/0041416 A1* | 3/2004 | Harrison | B60D 1/488 293/117 |
| 2006/0066115 A1* | 3/2006 | Haneda | B60R 19/34 293/133 |
| 2007/0182176 A1* | 8/2007 | Muskos | B60R 19/34 293/133 |
| 2007/0222239 A1* | 9/2007 | Arns | B60R 19/24 293/132 |
| 2008/0030031 A1* | 2/2008 | Nilsson | B60R 19/34 293/133 |
| 2008/0217935 A1* | 9/2008 | Braunbeck | B60R 19/34 293/132 |
| 2008/0224487 A1* | 9/2008 | Wang | B60R 19/34 293/132 |
| 2009/0001737 A1* | 1/2009 | Salomonsson | B60R 19/34 293/133 |
| 2009/0115208 A1* | 5/2009 | Kano | F16F 7/12 293/132 |
| 2009/0261602 A1* | 10/2009 | Karlander | B60R 19/34 293/132 |
| 2010/0148526 A1* | 6/2010 | Karlander | B60R 19/34 293/155 |
| 2010/0164238 A1* | 7/2010 | Nakanishi | B60R 19/34 293/132 |
| 2011/0187135 A1* | 8/2011 | Kano | B60R 19/34 293/133 |
| 2011/0291431 A1* | 12/2011 | Buschsieweke | C22C 38/32 293/133 |
| 2012/0205927 A1* | 8/2012 | Asakawa | B60R 19/34 293/132 |
| 2013/0048455 A1* | 2/2013 | Friedrich | F16F 7/127 188/377 |
| 2013/0106123 A1* | 5/2013 | Carlson | B23K 20/1265 293/155 |
| 2013/0306419 A1* | 11/2013 | Okuda | B60R 19/34 188/377 |
| 2014/0034435 A1* | 2/2014 | Kondo | B60R 19/34 188/377 |
| 2014/0144736 A1* | 5/2014 | Browne | B32B 15/011 188/268 |
| 2014/0292007 A1* | 10/2014 | Kawamata | B60R 19/34 293/133 |
| 2014/0353990 A1* | 12/2014 | Ishitobi | B21D 39/044 293/133 |
| 2015/0001866 A1* | 1/2015 | Noyori | B60R 19/34 293/133 |
| 2015/0197206 A1* | 7/2015 | Tamura | B60R 19/023 293/133 |
| 2015/0217709 A1* | 8/2015 | Kim | B60R 19/34 293/133 |
| 2015/0343972 A1* | 12/2015 | Lee | B60R 19/34 293/133 |
| 2016/0001725 A1* | 1/2016 | Nakanishi | B60R 19/34 293/133 |
| 2016/0010713 A1* | 1/2016 | Koga | B62D 21/15 188/377 |
| 2016/0129866 A1* | 5/2016 | Kamiya | B60R 19/34 293/133 |
| 2016/0356334 A1* | 12/2016 | Onoue | B62D 25/04 |
| 2017/0021868 A1* | 1/2017 | Watanabe | B62D 21/152 |
| 2017/0057440 A1* | 3/2017 | Kitakata | B60R 19/30 |
| 2017/0080884 A1* | 3/2017 | Kitakata | B62D 21/02 |
| 2017/0320455 A1* | 11/2017 | Nakayama | B62D 21/152 |
| 2018/0257589 A1* | 9/2018 | Kawamura | B60R 19/24 |
| 2018/0281715 A1* | 10/2018 | Lu | F16F 7/12 |
| 2018/0297098 A1* | 10/2018 | Kerr | B21D 22/025 |
| 2018/0334121 A1* | 11/2018 | Sabu | B62D 21/152 |
| 2020/0094760 A1* | 3/2020 | Yamada | B62D 21/152 |
| 2020/0324823 A1* | 10/2020 | Kawamura | B62D 21/08 |
| 2020/0384934 A1* | 12/2020 | Yotsuyanagi | B60R 19/34 |

* cited by examiner

VEHICULAR ENERGY ABSORBING MEMBER AND MANUFACTURING METHOD THEREOF

CROSS-REFERENCE TO RELATED APPLICATION

This application claims priority to Japanese Patent Application No. 2019-092881 filed on May 16, 2019, incorporated herein by reference in its entirety.

BACKGROUND

1. Technical Field

The disclosure relates to a vehicular energy absorbing member and a manufacturing method thereof.

2. Description of Related Art

A vehicular energy absorbing member that is disposed between a bumper reinforcement of a vehicle and a framework (such as a side member) of the vehicle and absorbs an impact at the time of collision of the vehicle is known. For example, Japanese Patent Application Publication No. 2007-261557 (JP 2007-261557 A) discloses an impact absorption device of a vehicle including a tubular member and a bottom. The tubular member is formed in a conical shape in which the diameter decreases gradually from a first end to a second end in an axial direction of the tubular member. A stepped portion extending in a spiral shape from the first end to the second end of the tubular member is formed on the tubular member. The bottom is connected to the second end (a small-diameter end portion) of the tubular member.

SUMMARY

Since the tubular member of the impact absorption device of a vehicle described in JP 2007-261557 A has a conical shape, the tubular member can be formed relatively easily by spinning. On the other hand, an amount of impact energy absorbed by a vehicular energy absorbing member is desirably great in general.

The disclosure provides a vehicular energy absorbing member that can be formed by spinning and increase an amount of impact energy absorbed and a manufacturing method thereof.

According to a first aspect of the disclosure, there is provided a vehicular energy absorbing member that is disposed between a bumper reinforcement and a framework of a vehicle. The vehicular energy absorbing member includes an energy absorbing portion. The energy absorbing portion has a tubular shape and is configured to absorb impact energy by being plastically deformed to be compressed in an axial direction. An outer circumferential surface of the energy absorbing portion has a circular tubular shape and an inner circumferential surface of the energy absorbing portion includes a ridge portion having a shape extending parallel to the axial direction of the energy absorbing portion.

According to this configuration, in the vehicular energy absorbing member, since the outer circumferential surface of the energy absorbing portion is formed in a circular tubular shape and the inner circumferential surface of the energy absorbing portion includes the ridge portion, the energy absorbing portion can be relatively easily formed by spinning using a rotation shaft member having an outer circumferential surface corresponding to the ridge portion. Since a ridge extending parallel to the axial direction of the energy absorbing portion is formed on the inner circumferential surface of the energy absorbing portion, a compressive load, that is, an amount of impact energy absorbed, in the axial direction of the energy absorbing portion is enhanced.

According to a second aspect of the disclosure, there is provided a method of manufacturing a vehicular energy absorbing member that is disposed between a bumper reinforcement and a framework of a vehicle. The method includes the following: disposing a tubular member around a rotation shaft member having an outer circumferential surface with a polygonal pillar shape; and forming an energy absorbing portion including an inner circumferential surface having a polygonal tubular shape corresponding to the shape of the outer circumferential surface of the rotation shaft member and an outer circumferential surface having a circular tubular shape with an outer diameter which is defined by a pressing member by moving the pressing member in a direction parallel to the outer circumferential surface of the rotation shaft member while pressing an outer circumferential surface of the tubular member with the pressing member against the rotation shaft member in a state in which the tubular member along with the rotation shaft member rotates around a center axis of the rotation shaft member.

According to this method, the vehicular energy absorbing member including the energy absorbing portion with a large amount of impact energy absorbed can be simply formed by spinning using the rotation shaft member having an outer circumferential surface with a polygonal pillar shape.

As described above, according to the disclosure, it is possible to provide a vehicular energy absorbing member that can be formed by spinning and increase an amount of impact energy absorbed and a manufacturing method thereof.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
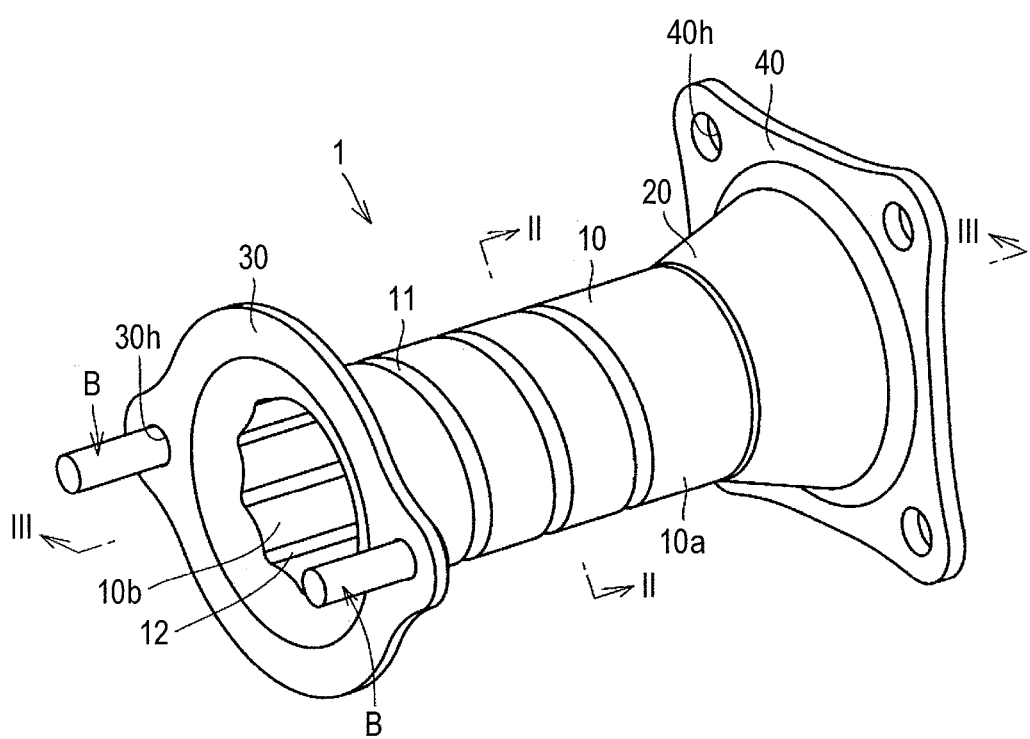
FIG. 1 is a perspective view of a vehicular energy absorbing member according to a first embodiment of the disclosure.

In the above-mentioned vehicular energy absorbing member, the ridge portion may include a plurality of convex portions that is arranged in a circumferential direction of the energy absorbing portion, and each convex portion of the plurality of convex portions may include an angular portion.

With this configuration, it is possible to effectively increase an amount of impact energy absorbed by the energy absorbing portion.

In the above-mentioned vehicular energy absorbing member, the ridge portion may further include a plurality of interposed portions that is interposed between the convex portions. In this case, each interposed portion of the plurality of interposed portions may have an arc shape that is concentric with the outer circumferential surface of the energy absorbing portion.

With this configuration, since concave and convex portions are formed on the inner circumferential surface of the energy absorbing portion by the plurality of convex portions and the plurality of interposed portions, it is possible to further increase an amount of impact energy absorbed by the energy absorbing portion.

In the above-mentioned vehicular energy absorbing member, the inner circumferential surface of the energy absorbing portion may have a polygonal tubular shape constituting the ridge portion.

With this configuration, it is also possible to effectively increase an amount of impact energy absorbed by the energy absorbing portion.

In this case, an inner shape of a section of the energy absorbing portion in a plane which is perpendicular to the axial direction of the energy absorbing portion may be convex-polygonal or concave-polygonal.

The above-mentioned vehicular energy absorbing member may further include a support portion that supports the energy absorbing portion. In this case, the support portion may be connected to a first end of the energy absorbing portion and may have a shape in which a diameter increases gradually as the support portion becomes farther separated from the energy absorbing portion in the axial direction of the energy absorbing portion.

With this configuration, when impact energy is applied to the vehicular energy absorbing member, the energy absorbing portion is prevented from being folded at a base end portion thereof (an end portion on a side which is connected to the framework of the vehicle).

In the above-mentioned vehicular energy absorbing member, the support portion may have a thickness which is larger than a thickness of the energy absorbing portion.

With this configuration, the above-mentioned advantageous effect can be more reliably achieved.

The above-mentioned vehicular energy absorbing member may further include a first flange portion and a second flange portion. The first flange portion may be connected to a second end of the energy absorbing portion and be connected to the bumper reinforcement. The second flange portion may be connected to the support portion and be connected to the framework of the vehicle.

With this configuration, the vehicular energy absorbing member can be easily attached to the bumper reinforcement and the framework of the vehicle.

In the above-mentioned vehicular energy absorbing member, the outer circumferential surface of the energy absorbing portion may include a groove having a shape which extends in a spiral shape around an axis of the energy absorbing portion in an area between a second end of the energy absorbing portion and an intermediate portion which is located between the second end of the energy absorbing portion and the first end of the energy absorbing portion.

With this configuration, when impact energy is applied to the energy absorbing portion, the energy absorbing portion can be effectively deformed to be compressed from the second end (an end portion on the bumper reinforcement side) to the first end of the energy absorbing portion.

The above-mentioned method of manufacturing a vehicular energy absorbing member may further include the following: after the energy absorbing portion has been formed, forming a groove having a shape which extends in a spiral shape around an axis of the energy absorbing portion in an area between an end portion on one side of the outer circumferential surface of the energy absorbing portion and an intermediate portion which is located between the end portion on one side and an end portion on the other side of the energy absorbing portion by moving the pressing member along the outer circumferential surface of the energy absorbing portion while pressing the pressing member onto the outer circumferential surface of the energy absorbing portion from the end portion on one side of the energy absorbing portion to the intermediate portion.

According to this method, when impact energy is applied to the energy absorbing portion, it is possible to form the energy absorbing portion that can be effectively deformed to be compressed from the end on one side (an end portion on the bumper reinforcement side) to the end on the other side of the energy absorbing portion.

Hereinafter, an embodiment of the disclosure will be described with reference to the accompanying drawings. In the drawings which are referred to in the following description, the same or corresponding members will be referred to by the same reference signs.

First Embodiment

FIG. 1 is a perspective view of a vehicular energy absorbing member according to a first embodiment of the disclosure. The vehicular energy absorbing member 1 is disposed between a bumper reinforcement (not illustrated) and a framework of a vehicle (not illustrated) such as a side member. The vehicular energy absorbing member 1 is a member that curbs transmission of impact energy applied to the bumper reinforcement to the framework of a vehicle. Specifically, the vehicular energy absorbing member 1 absorbs impact energy applied to the bumper reinforcement while being plastically deformed to be compressed.

As illustrated in FIG. 1, the vehicular energy absorbing member 1 includes an energy absorbing portion 10, a support portion 20, a first flange portion 30, and a second flange portion 40. In this embodiment, the vehicular energy absorbing member 1 is formed of aluminum.

Figure 2:
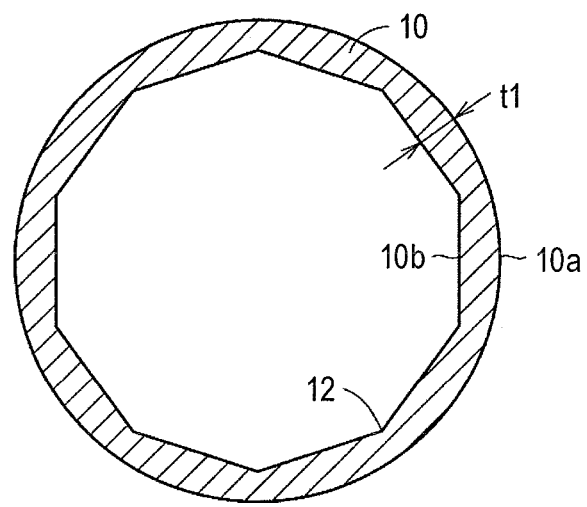
FIG. 2 is a sectional view taken along line II-II in FIG. 1.

The energy absorbing portion 10 is formed in a tubular shape. The energy absorbing portion 10 absorbs impact energy while being plastically deformed to be compressed in an axial direction of the energy absorbing portion 10. FIG. 2 is a sectional view taken along line II-II in FIG. 1. As illustrated in FIGS. 1 and 2, an outer circumferential surface 10a of the energy absorbing portion 10 is formed in a circular tubular shape, and an inner circumferential surface 10b of the energy absorbing portion 10 includes a ridge portion 12. The ridge portion 12 is a portion constituting a ridge having a shape extending parallel to the axial direction of the energy absorbing portion 10. An area of at least a part of the inner circumferential surface 10b of the energy absorbing portion 10 is formed in a polygonal tubular shape constituting the ridge portion 12. In this embodiment, the entire area of the inner circumferential surface 10b of the energy absorbing portion 10 is formed in a polygonal tubular shape. That is, the energy absorbing portion 10 includes the outer circumferential surface 10a with a circular tubular shape and the inner circumferential surface 10b with a polygonal tubular shape. In other words, over the entire area from a first end to a second end of the energy absorbing portion 10, an outer shape of a cross section of the energy absorbing portion 10 in a plane which is perpendicular to the axial direction of the energy absorbing portion 10 is a circular shape having a constant diameter and an inner shape thereof is a polygonal shape (a decagonal shape in this embodiment). The energy absorbing portion 10 may be formed in a shape in which the diameter increases gradually from the first end to the second end. In this embodiment, an inner shape of a section of the energy absorbing portion 10 in a plane which is perpendicular to the axial direction of the energy absorbing portion 10 is formed to be so-called convex-polygonal. The convex-polygonal shape is a polygon in which all interior angles are less than 180 degrees.

As illustrated in FIG. 1, the outer circumferential surface 10a of the energy absorbing portion 10 includes a groove 11 with a spiral shape which extends around an axis of the energy absorbing portion 10. The groove 11 extends from an end on a front side of the energy absorbing portion 10 (the left side in FIG. 1) to an end on a rear side. More specifically, the groove 11 is formed only in an area between the front end of the energy absorbing portion 10 and an intermediate portion between the front end and the rear end of the energy absorbing portion 10. The groove 11 may be omitted. In this specification, both a portion in which the groove 11 is formed on the outer circumferential surface 10a of the energy absorbing portion 10 and a portion in which the groove 11 is not formed are defined as the "outer circumferential surface with a circular tubular shape."

Figure 3:
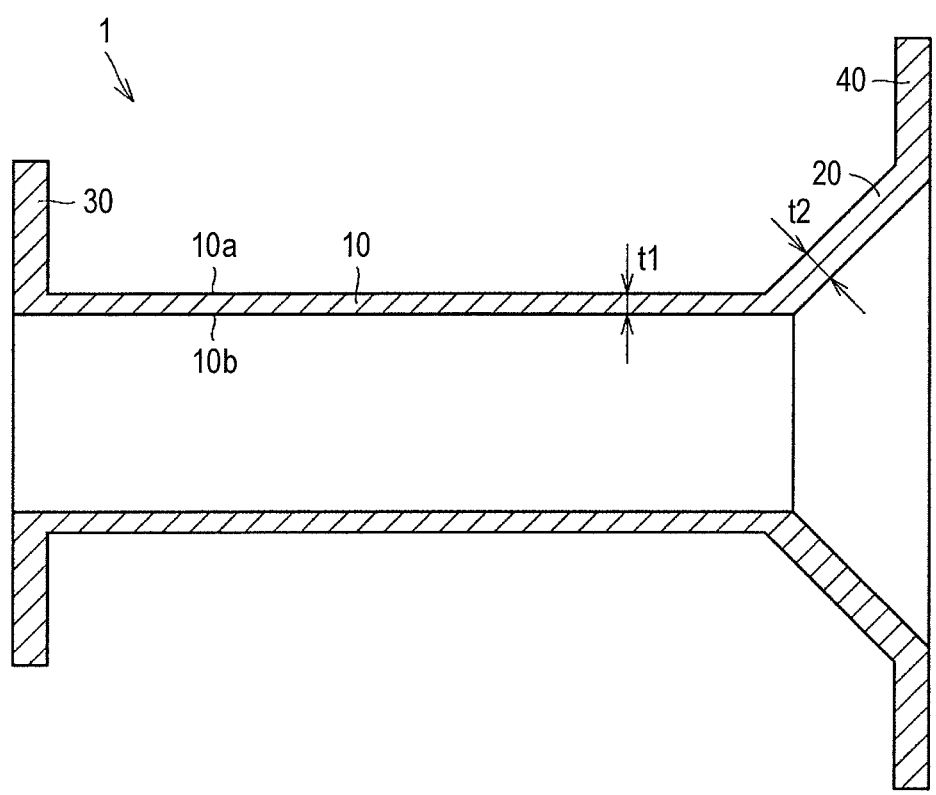
FIG. 3 is a sectional view taken along line III-III in FIG. 1.

The support portion 20 is a portion that supports the energy absorbing portion 10. The support portion 20 is connected to a first end (an end on the side connected to the framework of the vehicle) of the energy absorbing portion 10. The support portion 20 has a shape in which the diameter increases gradually as the support portion 20 becomes farther separated from the energy absorbing portion 10 in an axial direction of the energy absorbing portion 10. FIG. 3 is a sectional view taken along line III-III in FIG. 1. As illustrated in FIG. 3, the thickness t2 of the support portion 20 is larger than the thickness t1 of the energy absorbing portion 10. The thickness t2 of the support portion 20 is constant in the entire area from one end to the other end of the support portion 20. As illustrated in FIG. 2, the thickness t1 of the energy absorbing portion 10 refers to a thickness of a thickest portion of the energy absorbing portion 10 (the central portion of a part connecting neighboring ridges formed on the inner circumferential surface 10b of the energy absorbing portion 10).

The first flange portion 30 is connected to a second end (an end on the side connected to the bumper reinforcement) of the energy absorbing portion 10. The first flange portion 30 has a shape which extends outward in the radial direction of the energy absorbing portion 10 from the second end of the energy absorbing portion 10. A bolt insertion hole 30h into which a bolt B is inserted is provided in the first flange portion 30.

The second flange portion 40 is connected to an end of the support portion 20. The second flange portion 40 has a shape which extends outward in the radial direction of the support portion 20 from the end of the support portion 20. A bolt insertion hole 40h into which a bolt is inserted is provided in the second flange portion 40.

Figure 4:
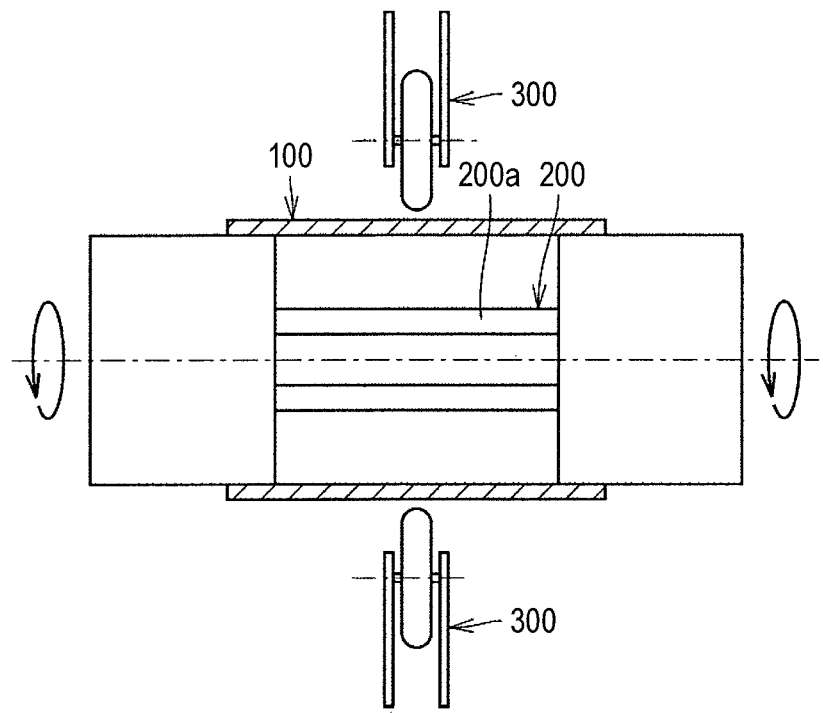
FIG. 4 is a diagram schematically illustrating a process of manufacturing the vehicular energy absorbing member illustrated in FIG. 1.
Figure 5:
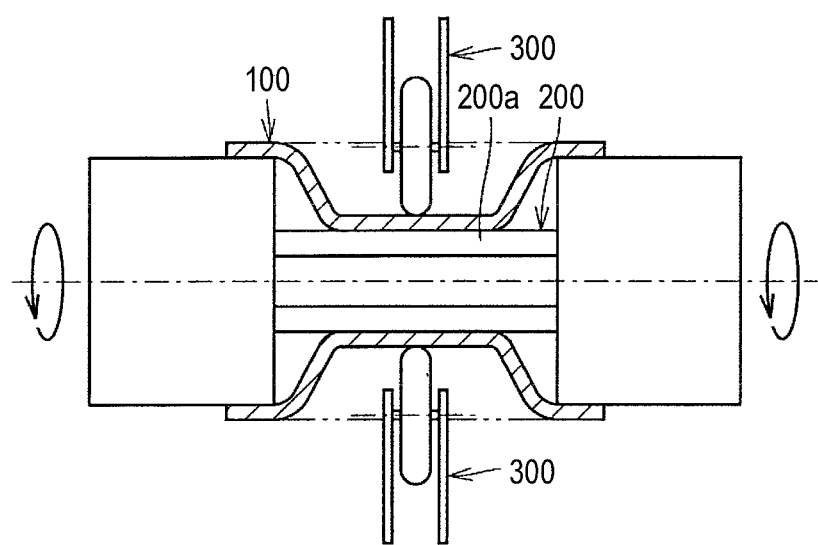
FIG. 5 is a diagram schematically illustrating the process of manufacturing the vehicular energy absorbing member illustrated in FIG. 1.

A method of manufacturing the vehicular energy absorbing member 1 will be described below with reference to FIGS. 4 and 5. FIGS. 4 and 5 are diagrams schematically illustrating a method of manufacturing the vehicular energy absorbing member 1 illustrated in FIG. 1. This method includes an energy absorbing portion forming step, a support portion forming step, a first flange portion forming step, and a second flange portion forming step.

In the energy absorbing portion forming step, the energy absorbing portion 10 is formed by spinning Specifically, in this step, first, a tubular member 100 which is formed of aluminum is disposed around a rotation shaft member 200 having an outer circumferential surface with a polygonal pillar shape as illustrated in FIG. 4. Then, in a state in which the tubular member 100 along with the rotation shaft member 200 is rotated around the center axis of the rotation shaft member 200, as illustrated in FIG. 5, a pressing member (a roller in this embodiment) 300 is moved in a direction parallel to the outer circumferential surface of the rotation shaft member 200 (a direction parallel to the center axis of the rotation shaft member 200) while pressing the outer circumferential surface of the tubular member 100 against the rotation shaft member 200 with the pressing member 300. Accordingly, the shape of the outer circumferential surface of the rotation shaft member 200 is transferred to a part of the inner circumferential surface of the tubular member 100 and a part of the outer circumferential surface of tubular member 100 is machined into a circular tubular shape with an outer diameter which is defined by the pressing member 300. In this way, the energy absorbing portion 10 including the inner circumferential surface 10b with a polygonal tubular shape and the outer circumferential surface 10a with a circular tubular shape is formed in a part of the tubular member 100.

Thereafter, the groove 11 is formed in a part of the outer circumferential surface 10a of the energy absorbing portion 10. Specifically, in this step, the groove 11 having a shape which extends in a spiral shape around the axis of the energy absorbing portion 10 is formed in an area between an end on one side on the outer circumferential surface 10a of the energy absorbing portion 10 and an intermediate portion which is located between the end on the one side of the energy absorbing portion 10 and an end on the other side by moving the pressing member 300 along the outer circumferential surface of the energy absorbing portion 10 while pressing the pressing member 300 against the outer circumferential surface 10a of the energy absorbing portion 10 from the end on the one side of the energy absorbing portion 10 to the intermediate portion.

In the support portion forming step, similarly to the energy absorbing portion forming step, the support portion 20 is formed in a part of the tubular member 100 by spinning. A support portion forming member (not illustrated) for forming the support portion 20 is connected coaxially to the rotation shaft member 200, and the support portion forming member has an outer circumferential surface with a shape corresponding to the inner circumferential surface of the support portion 20. The outer circumferential surface of the support portion forming member may have a conical shape or a polygonal conical shape. In this step, the pressing member 300 is moved such that the thickness t2 of the support portion 20 is larger than the thickness t1 of the energy absorbing portion 10.

In the first flange portion forming step and the second flange portion forming step, similarly to the energy absorbing portion forming step, a first flange element having a disc shape is formed at an end on one side of the energy absorbing portion 10 (an end opposite to the end connected to the support portion 20) in the tubular member 100, and a second flange element having a disc shape is formed at the end of the support portion 20 in the tubular member 100 by spinning. Thereafter, the first flange portion 30 is formed by pressing the first flange element, or the like and the second flange portion 40 is formed by pressing the second flange element, or the like. The first flange element and the second flange element may be formed by contracting or may be formed by expanding, similarly to the energy absorbing portion 10.

In this way, the vehicular energy absorbing member 1 is formed from the tubular member 100 which is a single member without bonding a plurality of members by welding or the like.

As described above, in the vehicular energy absorbing member 1 according to this embodiment, since the outer circumferential surface 10a of the energy absorbing portion 10 is formed in a circular tubular shape and the inner circumferential surface 10b of the energy absorbing portion 10 is formed in a polygonal tubular shape, the energy absorbing portion 10 can be relatively easily formed by spinning using the rotation shaft member 200 having an outer circumferential surface with a polygonal pillar shape. Since a plurality of ridges extending parallel to the axial direction of the energy absorbing portion 10 is formed on the inner circumferential surface 10b of the energy absorbing portion 10, a compressive load, that is, an amount of impact energy absorbed, in the axial direction of the energy absorbing portion 10 is enhanced.

Since the vehicular energy absorbing member 1 includes the support portion 20, the energy absorbing portion 10 is prevented from being folded at a base end thereof (an end on the side connected to the framework of the vehicle) when impact energy is applied to the vehicular energy absorbing member 1.

Since support portion 20 has a thickness t2 which is larger than the thickness t1 of the energy absorbing portion 10, the above-mentioned advantageous effect can be more reliably achieved.

Since the vehicular energy absorbing member 1 includes the first flange portion 30 and the second flange portion 40, the vehicular energy absorbing member 1 can be easily attached to the bumper reinforcement and the framework of the vehicle.

Since the groove 11 having a shape extending in a spiral shape is formed on the outer circumferential surface 10a of the energy absorbing portion 10, the energy absorbing portion 10 can be effectively deformed to be compressed from the second end of the energy absorbing portion 10 (the end on the bumper reinforcement side) to the first end when impact energy is applied to the energy absorbing portion 10.

Second Embodiment

Figure 6:
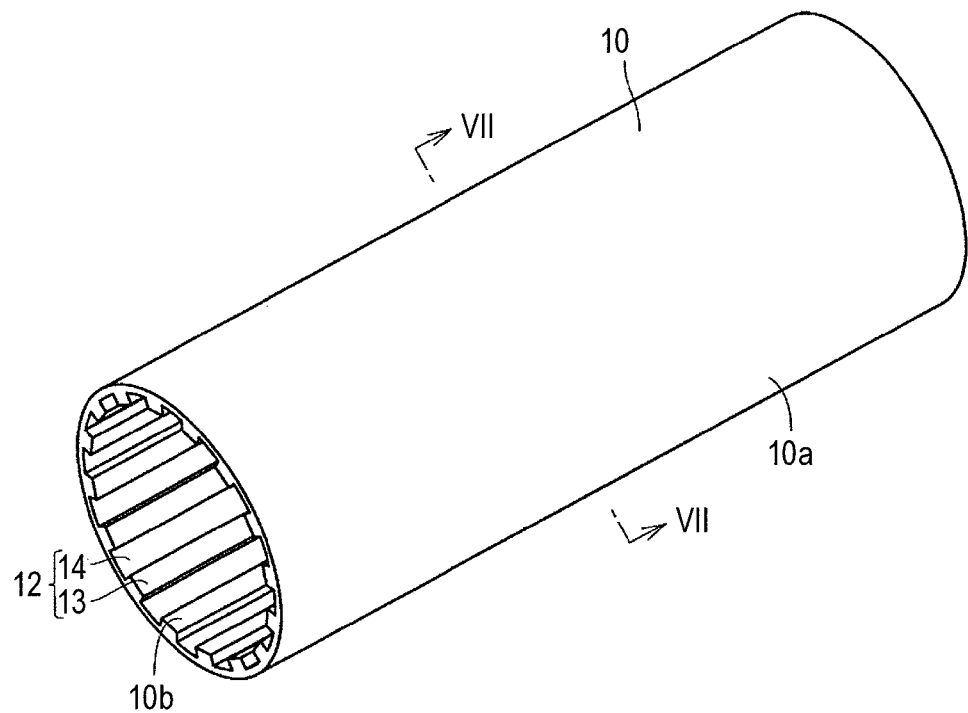
FIG. 6 is a perspective view of an energy absorbing portion of a vehicular energy absorbing member according to a second embodiment of the disclosure.
Figure 7:
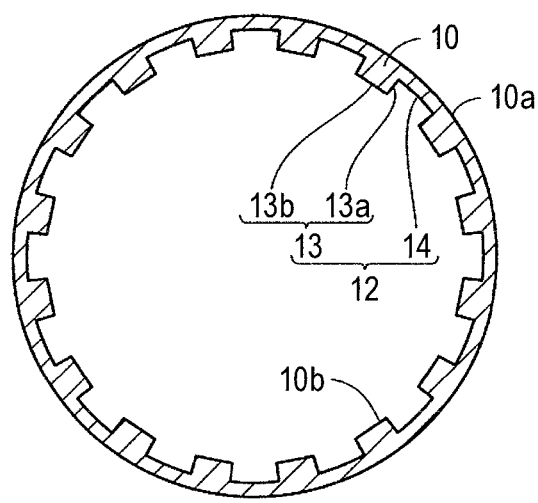
FIG. 7 is a sectional view taken along line VII-VII in FIG. 6.

A vehicular energy absorbing member 1 according to a second embodiment of the disclosure will be described below with reference to FIGS. 6 and 7. FIG. 6 is a perspective view of an energy absorbing portion 10 of a vehicular energy absorbing member according to a second embodiment of the disclosure. FIG. 7 is a sectional view taken along line VII-VII in FIG. 6. In the second embodiment, only parts which are different from those in the first embodiment will be described and description of the same structures, operations, and advantages as in the first embodiment will not be repeated.

In this embodiment, the shape of the inner circumferential surface 10b of the energy absorbing portion 10 is different from that in the first embodiment. Therefore, the inner circumferential surface 10b will be described below.

In this embodiment, the ridge portion 12 of the inner circumferential surface 10b includes a plurality of (16 in this embodiment) convex portions 13 and a plurality of (16 in this embodiment) interposed portions 14.

The plurality of convex portions 13 is arranged in the circumferential direction of the energy absorbing portion 10. A dimension between neighboring convex portions 13 is constant. That is, the plurality of convex portions 13 is arranged at equal intervals in the circumferential direction of the energy absorbing portion 10. Here, the dimension between neighboring convex portions 13 may vary. Each convex portion 13 includes an angular portion. The angular portion forms a ridge. As illustrated in FIG. 7, each convex portion 13 includes a pair of opposing portions 13a that opposes each other in the circumferential direction and a connection portion 13b that connects the opposing portions 13a. The connection portion 13b may be omitted and inner ends in a radial direction of the opposing portions 13a may be connected to each other.

Figure 8:
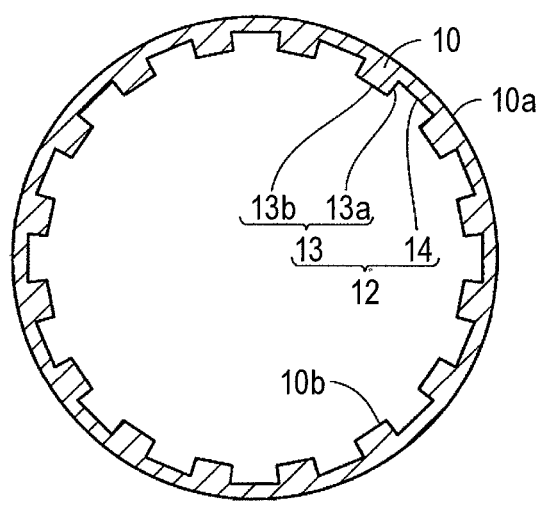
FIG. 8 is a sectional view of a modified example of the energy absorbing portion of the second embodiment.

Each interposed portion 14 is interposed between the convex portions 13. Specifically, each interposed portion 14 connects outer ends of the opposing portions 13a in the radial direction. Each interposed portion 14 is formed in an arc shape that is concentric with the outer circumferential surface 10a of the energy absorbing portion 10. Here, as illustrated in FIG. 8, each interposed portion 14 may be formed to be flat. That is, the inner shape of a section of the energy absorbing portion 10 in a plane which is perpendicular to the axial direction of the energy absorbing portion 10 may be formed in a so-called concave-polygonal shape. The concave-polygonal shape is a polygon having at least one reentrant angle (an interior angle which is equal to or greater than 180 degrees and less than 360 degrees). At least one of the plurality of interposed portions 14 may be omitted and the opposing portions 13a opposing each other in the circumferential direction may be connected directly to each other.

In the above-mentioned embodiment, it is possible to relatively easily form the energy absorbing portion 10 by spinning using the rotation shaft member 200 having an outer circumferential surface corresponding to the inner circumferential surface 10b and, since a plurality of ridges is formed on the inner circumferential surface 10b of the energy absorbing portion 10, it is possible to increase an amount of impact energy absorbed by the energy absorbing portion 10.

Figure 9:
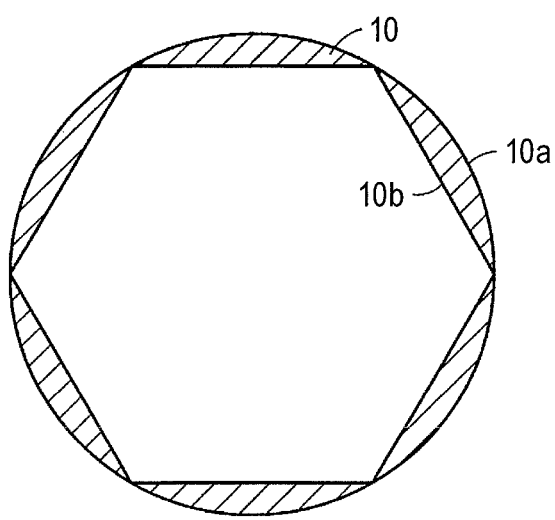
FIG. 9 is a sectional view of an energy absorbing portion of Example 1.
Figure 10:
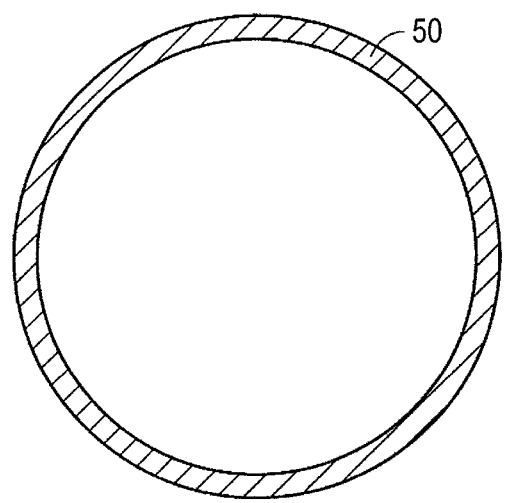
FIG. 10 is a sectional view of an energy absorbing portion according to a comparative example.
Figure 11:
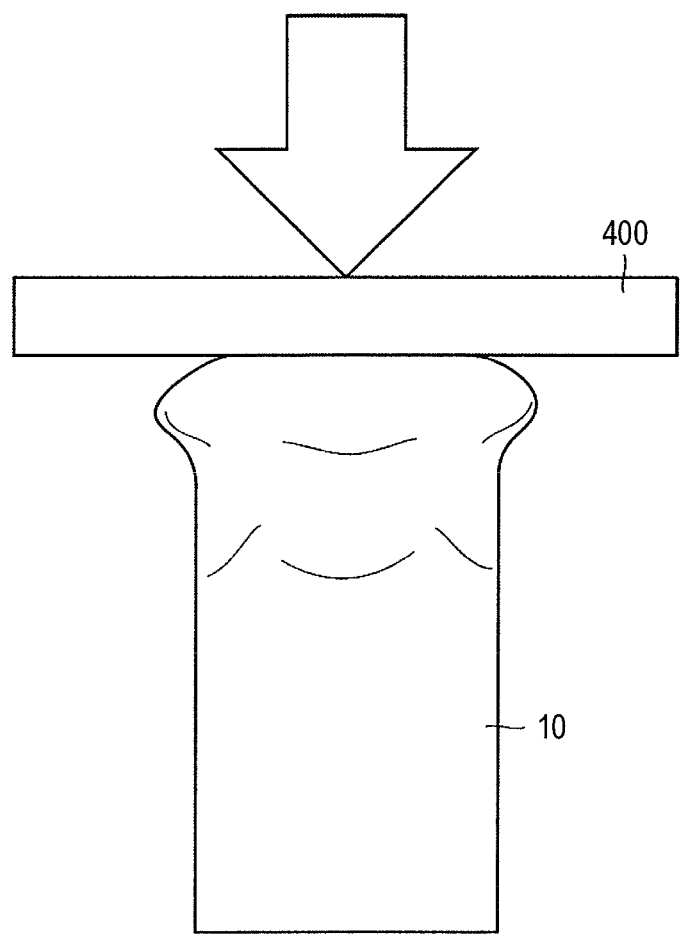
FIG. 11 is a diagram schematically illustrating a test method.
Figure 12:
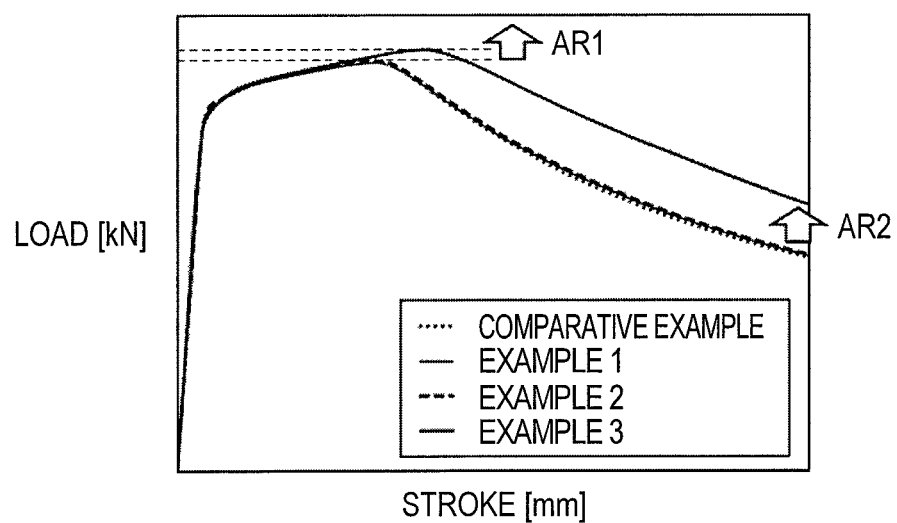
FIG. 12 is a graph illustrating results of analysis in the example and the comparative example.

Results of analysis of a compressive load in examples of the embodiment and a comparative example will be described below with reference to FIGS. 9 to 12. FIG. 9 is a sectional view of an energy absorbing portion according to Example 1. FIG. 10 is a sectional view of an energy absorbing portion according to a comparative example. FIG. 11 is a diagram schematically illustrating a test method. FIG. 12 is a graph illustrating results of analysis in the examples and the comparative example.

Example 1 is an example of the energy absorbing portion 10 according to the first embodiment. As illustrated in FIG. 9, the energy absorbing portion 10 according to Example 1 includes an outer circumferential surface 10a with a circular tubular shape and an inner circumferential surface 10b with a hexagonal tubular shape. The outer diameter of the energy absorbing portion 10 is 45 mm and the sectional area thereof is 281 mm².

Example 2 is also an example of the energy absorbing portion 10 according to the first embodiment. The energy absorbing portion 10 according to Example 2 is the energy absorbing portion 10 illustrated in FIG. 2, and has an outer circumferential surface 10a with a circular tubular shape and an inner circumferential surface 10b with a decagonal tubular shape. The outer diameter of the energy absorbing portion 10 is 45 mm and the sectional area thereof is 281 mm².

Example 3 is an example of the energy absorbing portion 10 according to the second embodiment. The energy absorbing portion 10 according to Example 3 is the energy absorbing portion 10 illustrated in FIG. 7, and has an outer circumferential surface 10a with a circular tubular shape and an inner circumferential surface 10b with 16 convex portions 13 and 16 interposed portions 14. The length of the each opposing portion 13a (the depth of each convex portion 13) is 1.7 mm, and the length of each connection portion 13b is 3.5 mm. The length of each interposed portion 14 in the circumferential direction is 4.6 mm, and the thickness of a portion between a boundary between the interposed portion 14 and the opposing portion 13a and the outer circumferential surface 10a (the length in the radial direction) is 1.3 mm. The outer diameter of the energy absorbing portion 10 is 45 mm and the sectional area thereof is 281 mm².

As illustrated in FIG. 10, an energy absorbing portion 50 according to the comparative example has a circular tubular shape. The outer diameter of the energy absorbing portion 50 is 45 mm and the inner diameter thereof is 40.8 mm and the sectional area thereof is 281 mm². The sectional area of the energy absorbing portion 50 according to the comparative example is the same as the sectional area of the energy absorbing portions 10 according to Examples 1 to 3. That is, the weight of the energy absorbing portion 50 according to the comparative example is the same as the weight of the energy absorbing portions 10 according to. Examples 1 to 3.

A load was applied in the axial direction of the energy absorbing portion to the energy absorbing portions according to the examples and the comparative example using a plate member 400 as illustrated in FIG. 11. FIG. 12 illustrates a relationship between a stroke of the plate member 400 and the load.

As illustrated in FIG. 12, the load of the energy absorbing portions 10 according to Examples 1 and 2 was greater than that in the comparative example. That is, by forming the inner circumferential surface of the energy absorbing portion 10 in a polygonal tubular shape, it was confirmed that an amount of impact energy absorbed is greater than that of the energy absorbing portion 50 according to the comparative example having the same weight as the weight of the energy absorbing portions 10 according to Examples 1 and 2. In other words, the same amount of impact energy absorbed as the amount of impact energy absorbed in the energy absorbing portion 50 according to the comparative example can be achieved by the energy absorbing portion 10 according to the example which is lighter than that of the energy absorbing portion 50 according to the comparative example.

The load of the energy absorbing portion 10 according to Example 3 was much greater than those in Examples 1 and 2. Specifically, the maximum load increases as indicated by an arrow AR1 in FIG. 12, and the load drop (the magnitude of the load which decreases from the maximum load as the stroke increases) decreased as indicated by an arrow AR2. That is, it was confirmed that an amount of impact energy absorbed by the energy absorbing portion 10 increased greatly by forming concave-convex portions on the inner circumferential surface 10b of the energy absorbing portion 10 using the convex portions 13 and the interposed portions 14.

It should be noted that the above-disclosed embodiment is exemplary in all respects and is not restrictive. The scope of the disclosure is represented by the appended claims, not by the above description of the embodiment, and includes all modifications within the meanings and scope equivalent to the claims.

For example, an inner shape of a cross section of the energy absorbing portion 10 in a plane which is perpendicular to the axial direction of the energy absorbing portion 10 is not limited to a polygonal shape such as a decagonal shape as long as a plurality of ridges extending parallel to the axial direction of the energy absorbing portion 10 is formed, and a part of the inner shape may be a shape (such as a circular arc shape) other than a polygonal shape. For example, the inner shape may form a closed cross section including three or more line segments.

At least one of the first flange portion 30 and the second flange portion 40 may be omitted. In this case, the omitted spot is bonded by welding or the like.

The groove 11 with a spiral shape may be provided in an entire area from the front end to the rear end of the energy absorbing portion 10. The pitch of the groove 11 may vary from the front end to the rear end of the energy absorbing portion 10. For example, the pitch of the groove 11 in the vicinity of the front end of the energy absorbing portion 10 may be set to be less than the pitch of the groove 11 which is formed in the other area.

What is claimed is:

1. A vehicular energy absorbing member that is disposed between a bumper reinforcement and a framework of a vehicle, the vehicular energy absorbing member comprising
an energy absorbing portion that has a tubular shape and is configured to absorb impact energy by being plastically deformed to be compressed in an axial direction,
wherein an outer circumferential surface of the energy absorbing portion has a circular tubular shape and an inner circumferential surface of the energy absorbing portion includes a ridge portion having a shape extending parallel to the axial direction of the energy absorbing portion.

2. The vehicular energy absorbing member according to claim 1, wherein the ridge portion includes a plurality of convex portions that is arranged in a circumferential direction of the energy absorbing portion, and
wherein each convex portion of the plurality of convex portions includes an angular portion.

3. The vehicular energy absorbing member according to claim 2, wherein the ridge portion further includes a plurality of interposed portions that is interposed between the convex portions.

4. The vehicular energy absorbing member according to claim 3, wherein each interposed portion of the plurality of interposed portions has an arc shape that is concentric with the outer circumferential surface of the energy absorbing portion.

5. The vehicular energy absorbing member according to claim 1, wherein the inner circumferential surface of the energy absorbing portion has a polygonal tubular shape constituting the ridge portion.

6. The vehicular energy absorbing member according to claim 5, wherein an inner shape of a section of the energy absorbing portion in a plane which is perpendicular to the axial direction of the energy absorbing portion is convex-polygonal.

7. The vehicular energy absorbing member according to claim 5, wherein an inner shape of a section of the energy absorbing portion in a plane which is perpendicular to the axial direction of the energy absorbing portion is concave-polygonal.

8. The vehicular energy absorbing member according to claim 1, further comprising a support portion that supports the energy absorbing portion,
wherein the support portion is connected to a first end of the energy absorbing portion and has a shape in which a diameter increases gradually as the support portion becomes farther separated from the energy absorbing portion in the axial direction of the energy absorbing portion.

9. The vehicular energy absorbing member according to claim 8, wherein the support portion has a thickness which is larger than a thickness of the energy absorbing portion.

10. The vehicular energy absorbing member according to claim 8, further comprising:
a first flange portion that is connected to a second end of the energy absorbing portion and is connected to the bumper reinforcement; and
a second flange portion that is connected to the support portion and is connected to the framework of the vehicle.

11. The vehicular energy absorbing member according to claim 8, wherein the outer circumferential surface of the energy absorbing portion includes a groove having a shape which extends in a spiral shape around an axis of the energy absorbing portion in an area between a second end of the energy absorbing portion and an intermediate portion which is located between the second end of the energy absorbing portion and the first end of the energy absorbing portion.

* * * * *